United States Patent Office 2,921,092
Patented Jan. 12, 1960

2,921,092

DIALKYLAMINOALKOXYPHENYL KETONE DERIVATIVES

Robert I. Meltzer, White Meadow Lake, N.J., assignor to Warner-Lambert Pharmaceutical Company, Morris Plains, N.J., a corporation of Delaware No Drawing. Application October 8, 1956
Serial No. 614,339

7 Claims. (Cl. 260—566)

This invention relates to a series of new and valuable chemical compounds comprising nuclear-substituted dialkylaminoalkoxyphenyl derivatives represented by the general formula

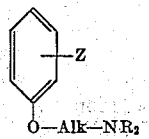

(I)

wherein Alk denotes a divalent aliphatic hydrocarbon radical possessing not less than two and not more than four carbon atoms, R denotes a lower alkyl radical, Z denotes a member of the following group of substituted ethyl radicals

—COC(R')=NOH
—COCH(R')NR"R'"
—CH(OH)CH(R')NR"R'"

wherein

R' denotes hydrogen or lower alkyl
R" denotes hydrogen, lower alkyl or aralkyl
R'" denotes hydrogen, lower alkyl or aralkyl R" and R'" may, together with the nitrogen atom between them, also represent a nitrogen-heterocyclic nucleus The compounds of this invention may be prepared in several ways in accordance with individual structural requirements. Illustrations of preparative methods are schematically represented below:

METHOD A

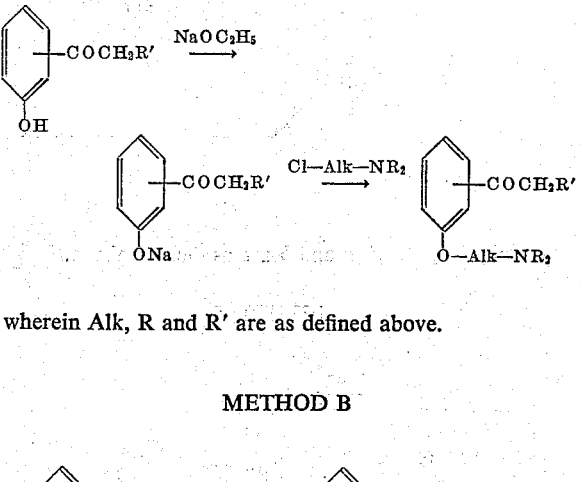

wherein Alk, R and R' are as defined above.

METHOD B

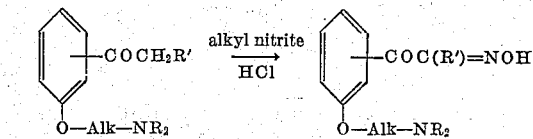

wherein Alk, R and R' are as defined above.

METHOD C

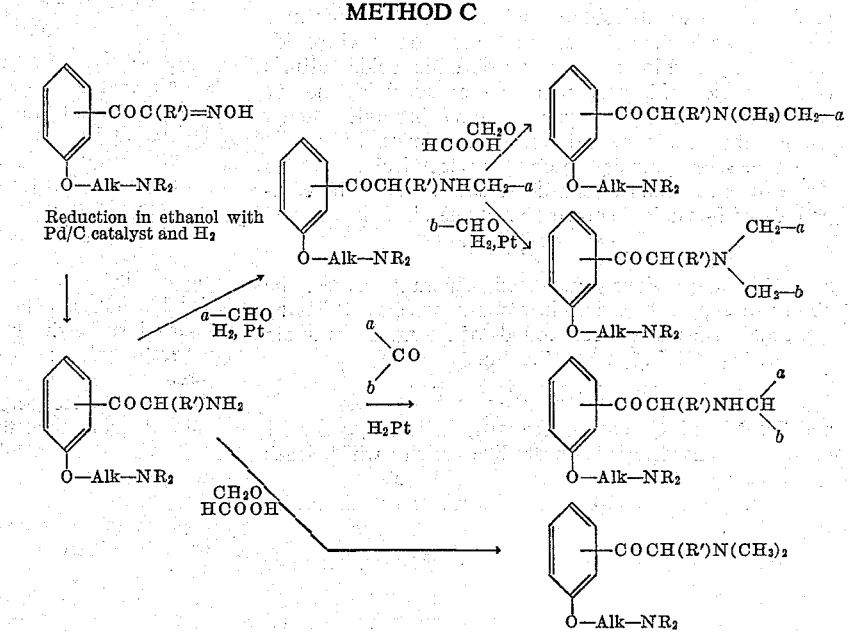

wherein $a$ and $b$ denote hydrogen, lower alkyl, aryl and aralkyl, and Alk, R and R' are as defined above.

METHOD D

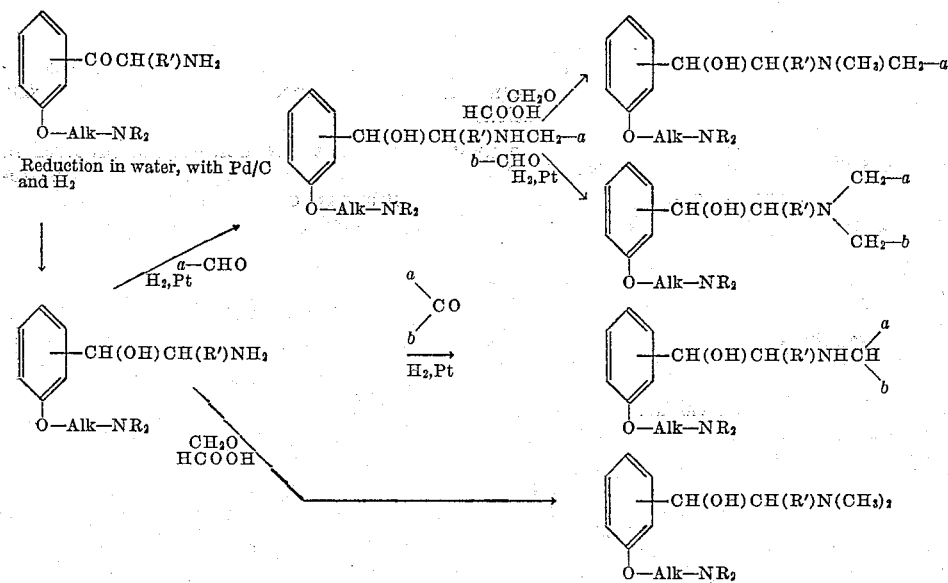

wherein Alk, R, R', *a* and *b* are as defined above.

METHOD E

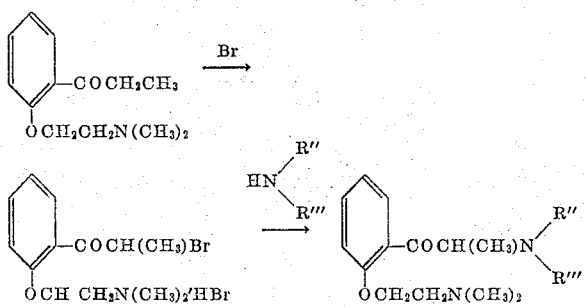

wherein R" and R'" are as defined above.

Method E may be suitably applied to dialkylaminoalkyl ethers of o-dimethylaminopropiophenone.

In the form of the free bases, the compounds of this invention are water-insoluble substances. Water-soluble salts may be formed by treating the free bases with acids such as hydrochloric acid, hydrobromic acid, sulfuric acid, tartaric acid, propionic acid or succinic acid, or with quaternizing agents such as methyl bromide, methyl iodide, ethyl iodide, benzyl bromide or dimethylsulfate.

The new compounds are of pharmaceutical value particularly as muscular spasm depressants. Thus the compounds of Formula I shown above wherein Z is

—COC(R')=NOH and R' is as previously indicated, generally possess the ability to suppress spasms in smooth muscle, while the quaternary salts of the compounds of Formula I wherein Z is either —COCH(R')NR"R'" or

—CH(OH)CH(R')NR"R'"

and R', R" and R'" are as previously indicated, generally possess the characteristic curare-like activity which leads to the suppression of spasms in striated muscle.

The following examples are illustrative of this invention.

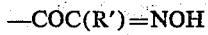

*Example I.—2-(2'-dimethylaminoethoxy)propiophenone*

Dimethylaminoethyl chloride hydrochloride (1115 g., 7.7 mol) was placed in a separatory funnel with an equal volume of ice-water and an equal volume of benzene. The aqueous layer was then made strongly basic with aqueous sodium hydroxide and the benzene layer was separated and dried over solid sodium hydroxide. The resulting benzene solution was added to a solution of sodium (177 g., 7.7 mol) and O-hydroxypropiophenone (1160 g., 7.7 mol) in absolute ethanol. The resulting mixture was allowed to stand overnight at room temperature and then heated under reflux 3.5 hours. The reaction mixture was concentrated by removing about 5 liters of solvent under vacuum, filtered to remove the precipitated sodium chloride and evaporated further under vacuum to remove all remaining solvent. The residue was dissolved in ether and the resulting solution was washed successively with 10% aqueous sodium hydroxide, 6 N hydrochloric acid and concentrated hydrochloric acid. The acidic extracts were combined, neutralized with aqueous sodium hydroxide, whereupon an oil separated which was dried over solid sodium hydroxide, and distilled under reduced pressure. B. p. 107–109° C. at 0.05 mm., $n_D^{25}$ 1.5182. The distillate was the desired 2-(2'-dimethylaminoethoxy)propiophenone. Yield 930 g. (40%).

*Example II.—2-(2'-diethylaminoethoxy)-α-isonitrosopropiophenone hydrochloride*

A solution of hydrogen chloride (30 g., 0.8 mol) in absolute ethanol (160 cc.) was added to a solution of o-diethylaminoethoxypropiophenone (149.5 g., 0.6 mol) (prepared in a manner similar to that described in Example I for o-dimethylaminoethoxypropiophenone) in absolute ethyl ether (390 cc.), with stirring and cooling and the resulting stirred suspension was treated with butyl nitrite (93 g., 0.9 mol) at a sufficiently rapid rate to maintain a spontaneous, gentle reflux. After all the butyl nitrite had been added, stirring was continued for 2½ hours. The granular precipitate was filtered and washed successively with ether-ethanol (2.5:1 by vol.) etherethanol (1:1 by vol.) and ether whereupon the desired product was obtained (180 g.) melting at 162–163.5° C. Recrystallization of the material from absolute ethanol raised the melting point to 164–166° C.

The desired hydrobromide was prepared by dissolving the free base (10 g.) in dry ether (200 cc.) followed by treatment with an excess of hydrogen bromide whereupon a precipitate was produced which was separated and recrystallized from isopropanol. M.P., 117–118°, yield 12 g.

*Example III.—4(2'-dimethylaminoethoxy)-α-isonitrosopropiophenone ethiodide*

To a solution of 4-(2'-dimethylaminoethoxy)-α-nitrosopropiophenone hydrochloride (5.7 g., 0.02 mol) [prepared in a similar manner to that described in Example II for 2-(2'-diethylaminoethoxy)-α-isonitrosopropiophenone hydrochloride] in about 20 cc. of cold water, a 4 N aqueous solution of sodium hydroxide (4 cc.) was slowly added with stirring. After cooling the 4-(2'-dimethylaminoethoxy)-α-nitrosopropiophenone was separated and recrystallized from absolute ethanol giving 3.7 g. of material, M.P. 153°. A solution of this material (3.7 g., 0.02 mol) in absolute ethanol (50 cc.) was treated with ethyl iodide (6.8 g., 0.44 mol) and the resulting solution was refluxed 2 hours, cooled and the resulting precipitate was filtered and recrystallized from isopropanol whereupon the desired ethiodide was obtained, M.P. 139–140.5° C.

*Example IV.—1 - (2' - dimethylaminoethoxyphenyl)-2-amino-1-propanol dihydrochloride*

A mixture of 2-(2'-dimethylaminoethoxy)-α-isonitrosopropiophenone hydrochloride (110 g., 0.384 mol.) [prepared in a similar manner to that described in Example II for 2-(2'-diethylaminoethoxy)-α-isonitrosopropiophenone hydrochloride], 3.8 M alcoholic hydrogen chloride (300 cc.), absolute ethanol (580 cc.) and 10% palladium on charcoal (10 g.) was placed in a 2-liter pressure bomb under about 1,000 pounds of hydrogen pressure. The bomb was shaken 8 hours whereafter the hydrogen pressure had dropped by 140 pounds. The catalyst was removed by filtration, the alcohol was removed by distillation leaving 2-(2'-dimethylaminoethoxy)-α-aminopropiophenone. This material was reduced to the corresponding propanol derivative by dissolving it in water (750 cc.) adding fresh 10% palladium-charcoal catalyst (10 g.) and shaking the mixture under about 1,000 pounds of hydrogen pressure for 8 hours whereafter the pressure had dropped by 140 pounds. The reaction mixture was then filtered and the filtrate was evaporated to dryness leaving a residue which was recrystallized from absolute ethanol, giving the desired dihydrochloride (80 g., 67% yield), M.P. 235.5–236° C. A further recrystallization from methanol raised the melting temperature to 240–241.5°.

*Example V.—1-(2'-diethylaminoethoxyphenyl)-2-benzylamino-1-propanol dihydrobromide*

To a solution of 1-(2'-diethylaminoethoxyphenyl)-2-aminopropanol dihydrochloride (60 g.) [prepared in a manner similar to that described in Example IV for 1-(2' - dimethylaminoethoxyphenyl) - 2-aminopropanol dihydrochloride] in water (50 cc.), a 50% aqueous solution of sodium hydroxide (50 cc.) was added, and the mixture was ether extracted. The ether solution was dried over anhydrous magnesium sulfate, and the ether was removed by evaporation under reduced pressure, giving the free base 1-(2'-diethylaminoethoxyphenyl)-2-aminopropanol. A sample of this base (13.3 g., 0.05 mol.) was mixed with benzaldehyde (5.9 g., 0.05 mol.) and a previously reduced suspension of Adam's platinum oxide catalyst (0.3 g.) in absolute ethanol (25 cc.). The mixture was shaken with hydrogen at 45 pounds pressure, whereafter the mixture was filtered and the filtrate was treated with concentrated hydrobromic acid (6.5 cc.) and evaporated to dryness. After two recrystallizations from isopropanol the residue gave the desired dihydrobromide, M.P. 202–203° C.

*Example VI.—1-(4'-dimethylaminoethoxyphenyl)-2-benzylmethylamino-1-propanol dihydrochloride*

An aqueous solution of 1-(4'-dimethylaminoethoxyphenyl)-2-benzylaminopropanol dihydrochloride (4.6 g.) [prepared in a similar manner to that described in Example V for 1-(2'-diethylaminoethoxyphenyl)-2-benzylamino-1-propanol dihydrobromide] was made basic with sodium hydroxide and ether extracted and the ether solution was dried over anhydrous magnesium sulfate and the ether removed under reduced pressure. The residual base (3.9 g.) was mixed with 98–100% formic acid (9.5 cc.) and 37% aqueous formaldehyde solution (20 cc.) and the mixture was heated 2.5 hours on the steam bath then 2 hours in an oil bath at 140° C. The reaction mixture was allowed to cool and concentrated hydrochloric acid (4 cc.) was added thereto and the resulting mixture evaporated to dryness under reduced pressure. Further concentrated hydrochloric acid (4 cc.) was added to the residue and the resulting mixture once more evaporated to dryness. The residue, which was now free of formic acid, was recrystallized from isopropanol giving the desired dihydrochloride, M.P. 196.5–198° C.

*Example VII.—1-(2'-diethylaminoethoxyphenyl)-2-dimethylamino-1-propanol dihydrochloride*

A mixture of 1-(2'-diethylaminoethoxyphenyl)-2-amino-1-propanol (5.3 g., 0.02 mol.) (prepared as described in Example V), 98–100% formic acid (6.2 g., 0.137 mol.) and 37% aqueous formaldehyde solution (10 g., 0.114 mol.) was heated 3 hours at 140–150° C. and then allowed to cool whereafter concentrated hydrochloric acid (3 cc.) was added and the resulting mixture was evaporated to dryness under reduced pressure. The residue was recrystallized from a mixture of n-butanol (20 cc.) and ethyl acetate (85 cc.) whereupon the desired dihydrochloride was obtained melting at 195–197° C.

*Example VIII.—1-(4'-diethylaminoethoxyphenyl)-2-diethylamino-1-propanol dihydrobromide*

Acetaldehyde (2.2 g., 0.05 mol.) was added with stirring and cooling, to a suspension of Adam's platinum oxide catalyst (0.2 g.) in absolute ethanol (50 cc.) containing 1-(4'-diethylaminoethoxyphenyl)-2-amino-1-propanol (5.3 g., 0.02 mol.) [prepared in a similar manner to that described in Example V for 1-(2'-diethylaminoethoxyphenyl)-2-amino-1-propanol]. The mixture was shaken with hydrogen, at atmospheric pressure, for 24 hours during which the hydrogen uptake was very slow. Further acetaldehyde (2.2 g.) was then added and hydrogenation was continued another 24 hours, whereafter the catalyst was removed by filtration and the solvent evaporated from the filtrate. The residue was dissolved in isopropanol and the resulting solution was treated with hydrogen bromide whereupon crystals separated. The latter were recrystallized from absolute ethanol to give the desired dihydrobromide melting at 214–215° C.

*Example IX.—1-(2'-diethylaminoethoxy)-2-isopropylamino-1-propanol dihydrochloride*

A solution of 1-(2'-diethylaminoethoxyphenyl)-2-amino-1-propanol (5.3 g., 0.02 mol.) (prepared as described in Example V) and acetone (1.6 cc., 0.025 mol.) in absolute ethanol (50 cc.) was set aside overnight then shaken 24 hours with hydrogen at atmospheric pressure, in the presence of Adam's platinum oxide catalyst (0.2 g.). The reaction mixture was then filtered and the filtrate evaporated to dryness whereafter the residue was dissolved in a mixture of equal parts by volume of absolute ethanol and isopropanol and the resulting solution treated with hydrogen chloride with cooling, whereupon crystals separated. The latter were recrystallized from absolute ethanol to give the desired dihydrochloride melting at 210.5–212° C.

*Example X.—1-(2'-diethylaminoethoxyphenyl)-2-diethylamino-1-propanol diethiodide*

An aqueous solution of 1-(2'-diethylaminoethoxyphenyl)-2-diethylamino-1-propanol dihydrobromide (3.7 g.) [prepared in a similar manner to that described in Example VIII for the corresponding para-isomer] was made basic with sodium hydroxide and then ether extracted whereafter the ether solution was dried over anhydrous magnesium sulfate and the solvent removed under reduced pressure. The residual base was dissolved in isopropanol (22 cc.) and ethyl iodide (6 cc.) was added thereto. The resulting solution was refluxed 12 hours, allowed to cool and the oily precipitate formed was separated, dissolved in hot isopropanol and reprecipitated by cooling the solution. The deposited crystalline solid was recrystallized from a mixture of isopropanol and absolute ethanol (1:2 by volume), giving the desired diethiodide melting at 224.5–225.5° C.

*Example XI.—1-(4'-dimethylaminoethoxyphenyl)-2-dimethylamino-1-propanol dibenzobromide*

An aqueous solution of 1-(4'-dimethylaminoethoxyphenyl)-2-dimethylamino - 1 - propanol dihydrochloride (3.38 g., M.P. 216–217° C.) [prepared from 1-(4'-dimethylaminoethoxyphenyl)-2-amino-1-propanol in a similar manner to that described as Example VII for 1-(2'-diethylaminoethoxyphenyl)-2-dimethylamino - 1-propanol dihydrochloride] was made basic with sodium hydroxide and then ether extracted whereafter the ether solution was dried over anhydrous magnesium sulfate and the solvent removed under reduced pressure. The residual base was dissolved in isopropanol (10 cc.), benzyl bromide (6.84 g.) was added thereto and the reaction mixture was refluxed one hour and set aside for about one week. The resulting precipitate was recrystallized from isopropanol containing a small amount of methanol giving the desired dibenzobromide melting at 175.5–177.5° C.

*Example XII. — 2-(2'-dimethylaminoethoxy)-α-diethylaminopropiophenone dihydrobromide*

A solution of bromine (174 g., 1.09 mols) in ice-cold methanol (1200 cc.) was added, over a period of 20 minutes to a solution of 2-(2'-dimethylaminoethoxy)-propiophenone (241 g., 1.09 mols) (prepared as described in Example 1) while stirring and keeping the reaction mixture at 10–20° and under a 300 watt electric lamp. Stirring was continued one hour at about 15° C., whereafter the reaction mixture was treated with acetone (5 cc.) to dispose of unreacted bromine, and the solvent was evaporated on the steam bath. The residue (about 600 cc.) was cooled, filtered and the solid product was washed with cold methanol and recrystallized from absolute ethanol whereupon 2-(2'-dimethylaminoethoxy)-α-bromopropiophenone hydrobromide was obtained melting at 167–168° C.

A sample of the above-described bromo-compound (76.2 g., 0.2 mol) was finely powdered, mixed with diethylamine (47.5 g., 15 mols) and the mixture was stirred overnight at room temperature. The precipitated diethylamine hydrobromide was filtered and the unreacted diethylamine in the filtrate was removed under reduced pressure. The residue was dissolved in ether, and the ether solution was dried over anhydrous magnesium sulfate whereafter the solvent was removed under reduced pressure and the residue therefrom treated with ethereal hydrogen bromide. The resulting gum was separated and crystallized from isopropanol whereupon the desired hydrobromide was obtained melting at 170.5–172° C.

*Example XIII.—2-(2'-dimethylaminoethoxy) - α - diethylaminopropiophenone dimethiodide*

2 - (2' - dimethylaminoethoxy) - α-diethylaminopropiophenone hydrobromide (M.P. 173–5° C., 3.2 g., 0.02 mol) (prepared as described in Example XII) was converted to the corresponding free base with sodium hydroxide, in the usual manner, and a solution of said free base in absolute ethanol (20 cc.) was treated with methyl iodide (11.4 g., 0.08 mol.). The resulting mixture was refluxed over-night, allowed to cool and the precipitate formed was filtered and recrystallized several times from absolute ethanol, whereupon the desired dimethiodide was obtained, melting at 195–196° C. with decomposition.

I claim:
1. A composition of matter selected from the group consisting of compounds having the formula

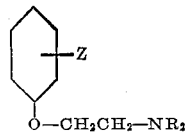

wherein R is a lower alkyl group and Z is a substituent of the group consisting of

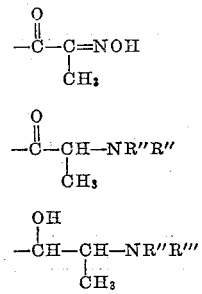

wherein R" and R'" are members of the group consisting of hydrogen, lower alkyl and benzyl, and the nontoxic salts and methiodide and ethiodide quaternaries thereof.

2. The compound represented by the following formula

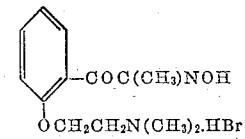

3. The compound represented by the following formula

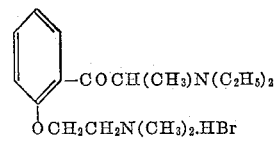

4. The compound represented by the following formula

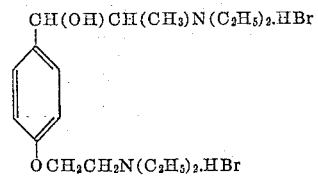

5. The compound represented by the following formula

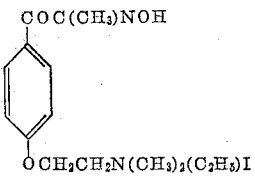

6. The compound represented by the following formula
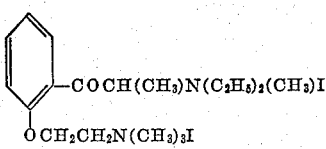
7. A compound having the formula
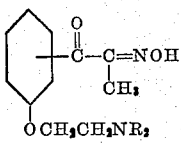
wherein R is a lower alkyl group.
References Cited in the file of this patent
UNITED STATES PATENTS
| | | |
|---|---|---|
| 1,894,865 | Hartman et al. | Jan. 17, 1933 |
| 1,995,710 | Hartung | Mar. 26, 1935 |
| 2,397,799 | Martin et al. | Apr. 2, 1946 |
| 2,567,906 | Hartung | Sept. 11, 1951 |
| 2,668,850 | Goldberg et al. | Feb. 9, 1954 |
| 2,765,307 | Schmidle | Oct. 2, 1956 |
| 2,771,469 | Schultz | Nov. 20, 1956 |
| 2,784,228 | Hartung | Mar. 5, 1957 |
OTHER REFERENCES
Beilstein: Handbuch der. Org. Chem., vol. 8, p. 288 (1925).